United States Patent
Baxter

(10) Patent No.: US 10,512,258 B2
(45) Date of Patent: Dec. 24, 2019

(54) ANIMAL TRAP WITH ANIMAL ENTRANCE ENCOURAGING MEANS

(71) Applicant: Joseph Baxter, Edmonton (CA)

(72) Inventor: Joseph Baxter, Edmonton (CA)

( * ) Notice: Subject to any disclaimer, the term of this patent is extended or adjusted under 35 U.S.C. 154(b) by 240 days.

(21) Appl. No.: 15/384,648

(22) Filed: Dec. 20, 2016

(65) Prior Publication Data

US 2017/0202204 A1    Jul. 20, 2017

Related U.S. Application Data

(60) Provisional application No. 62/280,764, filed on Jan. 20, 2016.

(51) Int. Cl.
*A01M 23/02* (2006.01)
*A01M 23/08* (2006.01)
(Continued)

(52) U.S. Cl.
CPC ............ *A01M 23/08* (2013.01); *A01M 23/02* (2013.01); *A01M 23/10* (2013.01); *A01M 23/12* (2013.01);
(Continued)

(58) Field of Classification Search
CPC ...... A01M 23/00; A01M 23/02; A01M 23/08; A01M 23/10; A01M 23/12; A01M 23/14; A01M 23/16; A01M 23/18; A01M 23/20
(Continued)

(56) References Cited

U.S. PATENT DOCUMENTS

| 91,131 A | * | 6/1869 | Herr | A01M 21/00 |
| | | | | 43/74 |
| 139,572 A | * | 6/1873 | Gould | A01M 23/12 |
| | | | | 43/73 |

(Continued)

FOREIGN PATENT DOCUMENTS

| CA | 2876735 A1 | * | 6/2016 | ............ A01M 23/16 |
| EP | 0251903 A1 | * | 1/1988 | ............ A01M 23/20 |

(Continued)

OTHER PUBLICATIONS

Translation of FR 2666006 (Year: 1992).*

*Primary Examiner* — Darren W Ark
(74) *Attorney, Agent, or Firm* — Kyle R Satterthwaite; Ryan W Dupuis; Ade & Company Inc.

(57) ABSTRACT

An animal trap features entrance encouraging mechanism for urging an animal into an enclosure of the trap. The mechanism features a pushing unit pivotally supported outside the interior space of the enclosure adjacent an access-way that opens into same. The pushing unit is pivotal about an axis generally parallel to a plane of the access-way for movement between a withdrawn position in which the access-way is unobstructed and a working position in which the pushing unit substantially obstructs the access-way. An actuator coupled to the pushing unit is triggered by an animal detection device at an approach area outside the enclosure within a travel path followed by the pushing unit, whereby the pushing unit urges the animal toward and through the access-way into the interior space of the enclosure. A one way gate prevents exit of the trapped animal after return of the pushing unit to the withdrawn position.

18 Claims, 9 Drawing Sheets

(51) Int. Cl.
| | | |
|---|---|---|
| *A01M 23/10* | (2006.01) | |
| *A01M 23/12* | (2006.01) | |
| *A01M 23/14* | (2006.01) | |
| *A01M 23/16* | (2006.01) | |
| *A01M 23/18* | (2006.01) | |
| *A01M 23/20* | (2006.01) | |
| *A01M 31/00* | (2006.01) | |

(52) U.S. Cl.
CPC ............ *A01M 23/14* (2013.01); *A01M 23/16* (2013.01); *A01M 23/18* (2013.01); *A01M 23/20* (2013.01); *A01M 31/002* (2013.01)

(58) Field of Classification Search
USPC .................. 43/60, 61, 58, 64–67, 73, 74, 76
See application file for complete search history.

(56) References Cited

U.S. PATENT DOCUMENTS

| | | | | |
|---|---|---|---|---|
| 524,425 A * | 8/1894 | Morton | A01M 21/00 | 43/65 |
| 540,991 A * | 6/1895 | Klar | A01M 21/00 | 43/76 |
| 607,691 A * | 7/1898 | Knoop | A01M 23/12 | 43/73 |
| 859,638 A * | 7/1907 | Bennett | A01M 23/12 | 43/73 |
| 892,756 A * | 7/1908 | Morris | A01M 23/08 | 43/66 |
| 1,213,997 A * | 1/1917 | Arrioja | A01M 21/00 | 43/74 |
| 1,214,060 A * | 1/1917 | Mutz | A01M 21/00 | 43/74 |
| 1,488,312 A * | 3/1924 | Bronson | A01M 23/38 | 43/61 |
| 1,501,463 A * | 7/1924 | Matejewski | A01M 23/00 | 43/74 |
| 1,521,474 A * | 12/1924 | Potthast | A01K 69/06 | 43/73 |
| 2,193,937 A * | 3/1940 | Pirani | A01M 23/02 | 43/65 |
| 2,445,166 A * | 7/1948 | Crumrine | A01M 23/12 | 43/74 |
| 2,693,050 A * | 11/1954 | Neid | A01M 23/18 | 217/57 |
| 2,793,464 A * | 5/1957 | Bird | A01M 23/02 | 43/61 |
| 2,842,891 A * | 7/1958 | Neid | A01M 23/02 | 43/66 |
| 3,393,468 A * | 7/1968 | Wood | A01M 23/08 | 43/66 |
| 3,415,006 A * | 12/1968 | Gilbaugh | A01M 23/14 | 43/67 |
| 3,834,063 A * | 9/1974 | Souza | A01M 23/02 | 43/61 |
| 4,145,834 A * | 3/1979 | Quigley | A01M 23/12 | 43/73 |
| 4,253,264 A * | 3/1981 | Souza | A01M 23/14 | 43/73 |
| 4,266,363 A * | 5/1981 | Chen | A01M 1/103 | 43/121 |
| 4,553,349 A * | 11/1985 | Tsai | A01M 23/06 | 43/70 |
| 4,779,373 A * | 10/1988 | Krenson | A01K 31/10 | 43/61 |
| 4,829,701 A * | 5/1989 | ImBrogno | A01K 31/10 | 43/61 |
| 4,890,415 A * | 1/1990 | Fressola | A01M 23/18 | 43/58 |
| 5,107,619 A * | 4/1992 | Zapata | A01M 23/30 | 43/58 |
| 5,185,953 A * | 2/1993 | Gross | A01M 23/12 | 43/58 |
| 5,560,146 A * | 10/1996 | Garro | A01M 1/02 | 43/111 |
| 5,778,594 A * | 7/1998 | Askins | A01M 23/20 | 119/474 |
| 5,815,982 A * | 10/1998 | Garretson | A01M 1/103 | 43/121 |
| 5,862,624 A * | 1/1999 | Askins | A01M 23/18 | 43/58 |
| 5,979,105 A * | 11/1999 | Marks | A01M 23/02 | 43/61 |
| 6,016,623 A * | 1/2000 | Celestine | A01M 23/04 | 43/61 |
| 6,088,948 A * | 7/2000 | R.o slashed.nnau | A01M 23/02 | 43/64 |
| 6,202,340 B1 * | 3/2001 | Nieves | A01M 23/02 | 43/61 |
| 6,484,672 B1 * | 11/2002 | Versaw | A01M 23/18 | 119/751 |
| 6,718,688 B2 * | 4/2004 | Garretson | A01M 1/026 | 43/111 |
| 6,772,555 B2 * | 8/2004 | Evans | A01M 23/20 | 43/61 |
| 6,807,767 B1 * | 10/2004 | Schade | A01M 31/002 | 43/77 |
| 6,836,999 B2 * | 1/2005 | Rich | A01M 19/00 | 43/98 |
| 6,865,843 B1 * | 3/2005 | Jordan, Sr. | A01M 23/12 | 43/139 |
| 7,026,942 B2 * | 4/2006 | Cristofori | A01M 23/04 | 340/384.2 |
| 7,051,472 B1 * | 5/2006 | Kelly | A01M 1/023 | 43/58 |
| 7,854,088 B2 * | 12/2010 | Kurachi | A01M 23/20 | 43/58 |
| 8,635,806 B2 * | 1/2014 | Gardner, Jr. | A01M 1/026 | 43/107 |
| 2015/0313202 A1 * | 11/2015 | Perry | A01M 23/16 | 340/573.2 |
| 2019/0029244 A1 * | 1/2019 | Steele | A01M 1/06 | |
| 2019/0159443 A1 * | 5/2019 | Brimah | A01M 23/18 | |
| 2019/0166823 A1 * | 6/2019 | Dick | A01M 31/002 | |

FOREIGN PATENT DOCUMENTS

| | | | | |
|---|---|---|---|---|
| EP | 638233 A1 * | 2/1995 | | |
| FR | 2666006 A1 * | 2/1992 | ............ | A01M 23/20 |
| FR | 2819987 A1 * | 8/2002 | ............ | A01M 23/02 |
| GB | 2454967 A * | 5/2009 | ............ | A01M 23/12 |
| JP | 05023090 A * | 2/1993 | ............ | A01M 23/08 |
| JP | 2000316456 A * | 11/2000 | | |
| JP | 2001346498 A * | 12/2001 | | |
| JP | 2005204628 A * | 8/2005 | | |
| JP | 2007068423 A * | 3/2007 | | |
| JP | 2012125232 A * | 7/2012 | | |
| JP | 2013090594 A * | 5/2013 | | |
| JP | 2013146231 A * | 8/2013 | | |
| JP | 2016208930 A * | 12/2016 | | |
| JP | 2017175924 A * | 10/2017 | | |
| JP | 2017192328 A * | 10/2017 | | |
| WO | WO-9006676 A1 * | 6/1990 | ............ | A01M 23/18 |
| WO | WO-2007068971 A1 * | 6/2007 | ............ | A01M 23/18 |

* cited by examiner

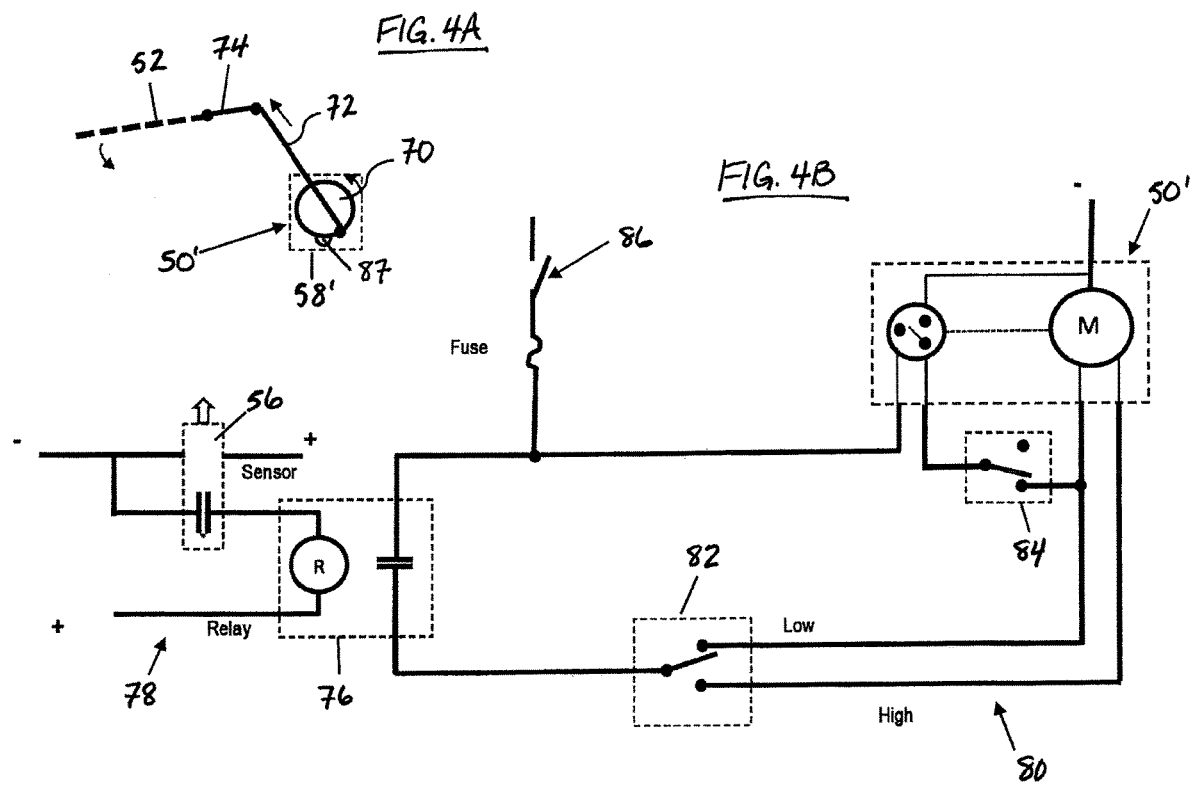
FIG. 4A
FIG. 4B
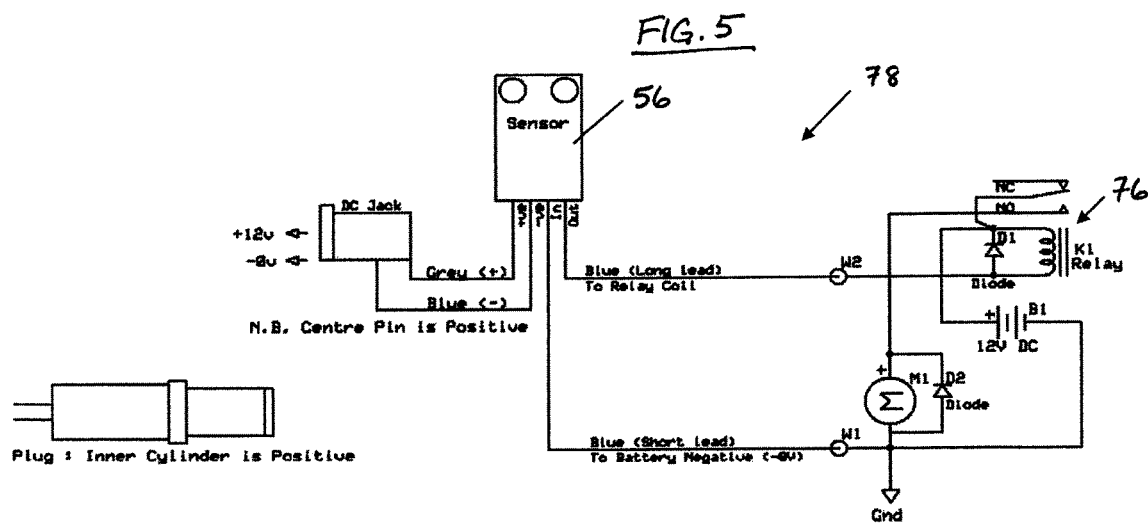
FIG. 5

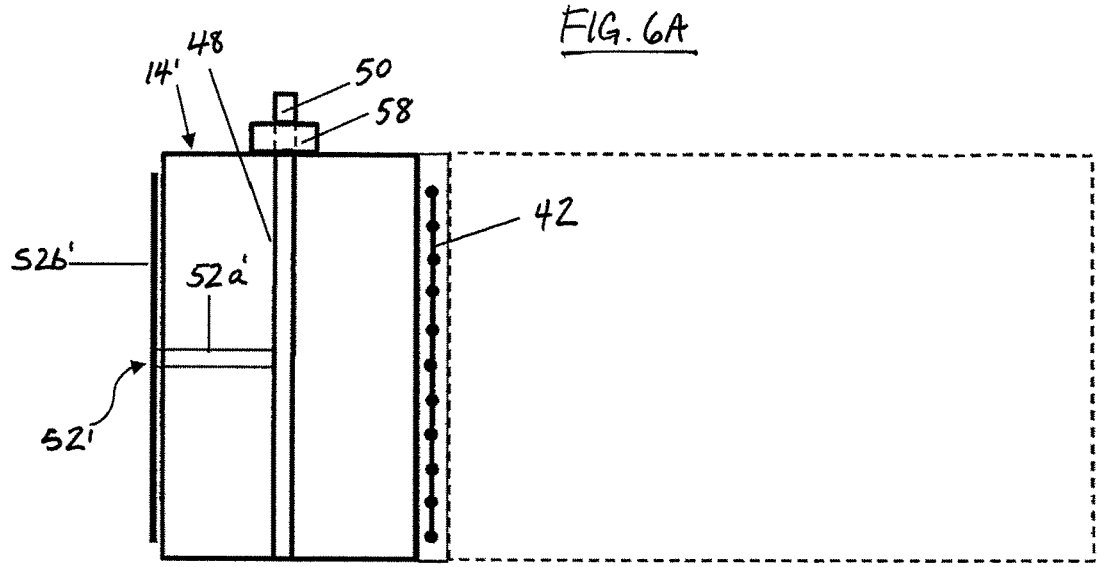
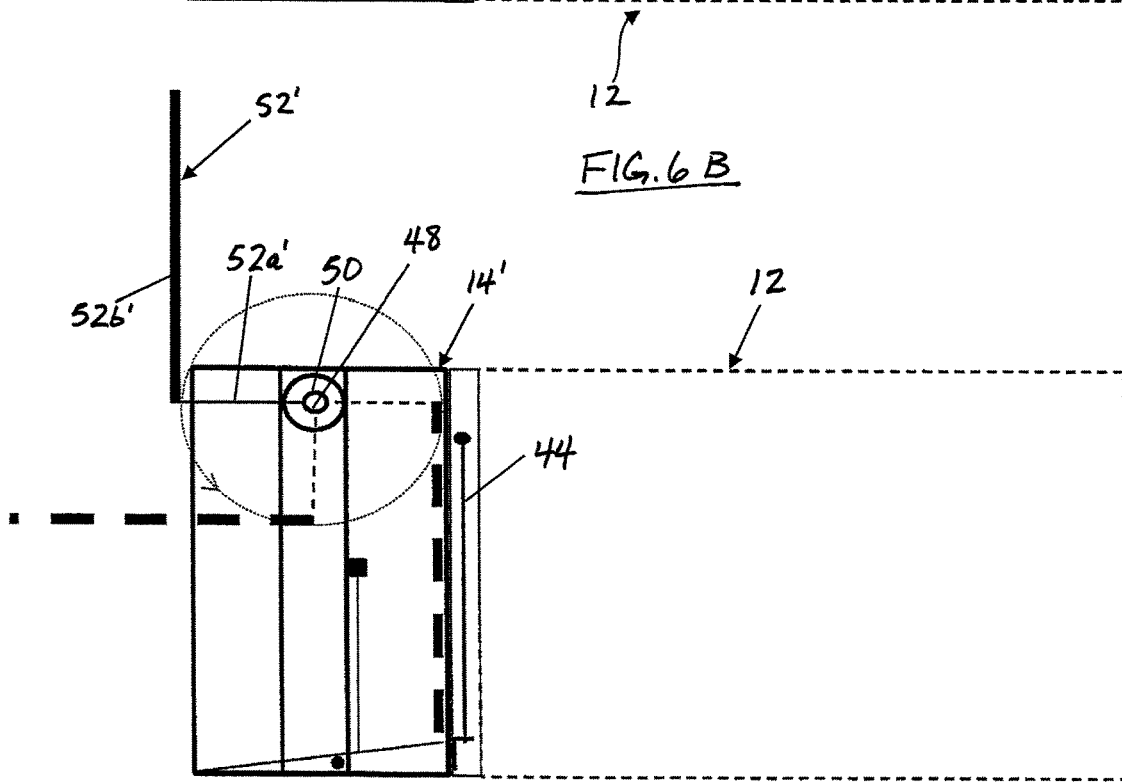
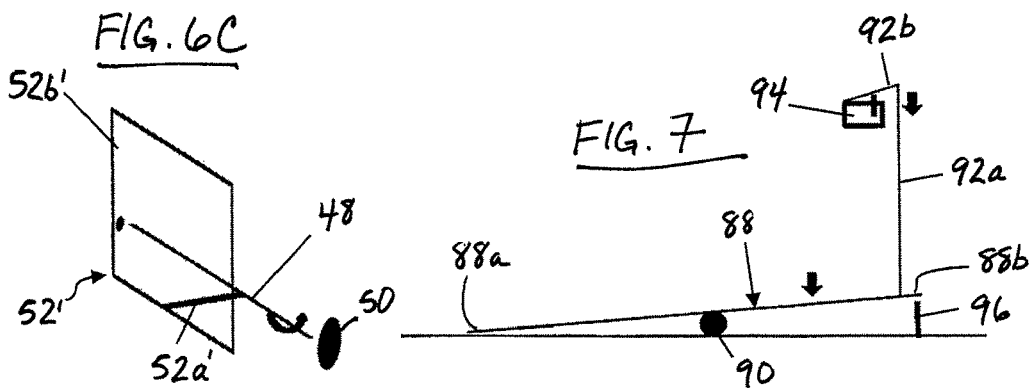
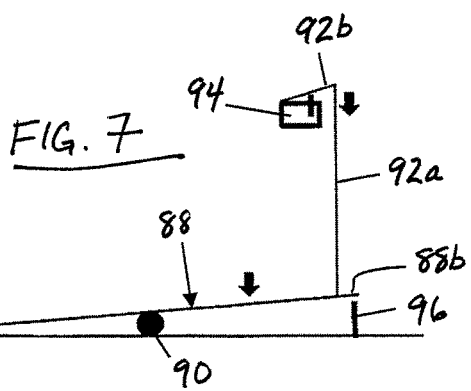

ANIMAL TRAP WITH ANIMAL ENTRANCE ENCOURAGING MEANS

CROSS REFERENCE TO RELATED APPLICATIONS

This application claims benefit under 35 U.S.C. 119(e) of Provisional Application Ser. No. 62/280,764, filed Jan. 20, 2017.

FIELD OF THE INVENTION

The present invention relates generally to animal traps, and more particularly to a unique animal trap that incorporates a means for encouraging the target animal into an enclosure of the trap upon arrival of the animal at an approach area adjacent an access opening of the enclosure.

BACKGROUND

In the field of animal control, a well-known type of bird trap, e.g. for capturing pigeons or other nuisance birds, features a caged enclosure with an access opening at one end thereof, at which a simple one-way gate mechanism is employed to allow birds to gain entry to the interior space of the enclosure, but preventing opening of the gate in the reverse direction from the inside the enclosure. The gate is basically made up of a plurality of tines that hang downwardly from a cross-bar spanning across the access opening near the top edge thereof. The tines have a length that slightly exceeds the height of the access opening, and their bottom ends reside on the interior side of the access opening. A bottom cross-member of a frame of the access opening thus blocks each tine from swinging outwardly through the access opening to the exterior of the enclosure, while the open interior space of the enclosure allows free swinging of the tines upwardly into the interior space of the enclosure. Accordingly, at least some of the tines hanging from the cross-bar will swing upward into their open positions when a bird walks through the opening in an attempt to access the bait set inside the trap, but once the bird has fully crossed through the access opening, the tines are gravitationally returned to their normal closed positions hanging over the access way. The tines cannot be opened in the reverse direction by application of force outwardly against them by the bird that is now securely trapped within the enclosure.

It would be desirable to improve on these bird traps by increase the rate of successful captures. It is known in the art that while a baited trap is often effective to attract the target bird into close proximity to the access opening, some of these attracted birds stop short of gaining full entry to the enclosure, and thus are not successfully trapped.

SUMMARY OF THE INVENTION

According to one aspect of the invention there is provided an animal trap apparatus with entrance encouraging means for urging an animal into the trap, said apparatus comprising:

an enclosure having an interior space bound by a base, upright walls standing upward from the base, and a roof spanning between the upright walls at a height spaced above the base, the enclosure having at least one access-way into the interior space through an absence of, or opening in, an end wall at a respective end of the enclosure; and an entrance-urging mechanism comprising:

a pushing unit pivotally supported at a location outside the interior space of the enclosure and adjacent the access-way thereof, the pushing unit being pivotal about an axis generally parallel to a plane of the access-way for movement between a withdrawn position in which the access-way is unobstructed by the pushing unit and a working position in which the pushing unit substantially obstructs the access-way;

an actuator coupled to the pushing unit and operable to effect movement thereof from the withdrawn position into the working position; and an animal detection device coupled to the actuator and operable to detect presence of an animal at an approach area residing outside the interior space of the enclosure and adjacent to the access-way within a travel path followed by the pushing unit between the withdrawn and working positions, the animal detection device being arranged to effect movement of the pushing unit into the working position upon detection of the animal at the approach area, whereby the pushing unit urges the animal toward and through the access-way into the interior space of the enclosure.

Preferably the pushing unit is supported adjacent a top edge of the access-way for pivotal motion of the pushing unit upwardly and downwardly about a generally horizontal axis lying cross-wise to the access-way adjacent the top edge thereof.

Preferably the pushing unit is mounted on a rotatable shaft that is coupled to the actuator for driven rotation of the shaft by the actuator to effect the movement of the pushing unit.

Preferably the pushing unit comprises a support member attached to the rotatable shaft and a pushing member attached to the support member at a distance outward from the rotatable shaft.

Preferably the pushing member has a broader width than the support member in a longitudinal direction of the rotatable shaft.

In one embodiment, the support member and the pushing member are coplanar with one another.

In another embodiment, the support member and the pushing member diverge from one another at a non-zero angle.

In such instance, preferably the rotatable shaft is spaced forwardly away from the access-way of the enclosure, and the support member is arranged to reach rearwardly toward the enclosure in the working position, where the pushing member hangs downwardly from said support member over the access opening of the enclosure, and reach forwardly from the enclosure in the withdrawn position, where the pushing members stands upwardly from the support member.

Preferably the non-zero angle is approximately ninety degrees.

Preferably the actuator comprises a motor arranged to drive the movement of the pushing unit.

Preferably the pushing unit is arranged to lie more parallel to the roof of the enclosure than to the plane of the access-way when in the withdrawn position.

Preferably a pair of side walls stand upright on opposing sides of the approach area to prevent the animal from laterally escaping the travel path of the pushing unit during movement thereof into the working position.

Preferably the pushing unit is arranged to automatically return to the withdrawn position after reaching the working position.

Preferably there is a one-way gate device arranged to automatically open the access-way under pushing of the animal thereinto by the pushing unit, and automatically re-close the access-way after the animal enters the interior space of the enclosure.

Preferably the entrance-urging mechanism is detachably coupled to the enclosure.

Preferably the one-way gate device is removable from the enclosure as part of the entrance-urging mechanism.

Preferably there is provided a closure member engagable with the enclosure member at the access-way thereof in a position between the interior space of the enclosure and the attached entrance-urging mechanism in order to enable removal of the detachable entrance-urging mechanism with the animal secured inside the enclosure.

Preferably the closure member comprises a slide panel and the enclosure comprises a pair of slide tracks at opposing edges of the access-way for cooperation with the closure member to guide sliding thereof into and out of the closed condition.

Preferably the slide panel is removable from the enclosure.

Preferably one of the upright walls of the enclosure at a second end thereof opposite the access-way is also removable, and the enclosure is of a fold-flat configuration in which the base, the roof and a pair of opposing side walls are hinged together about parallel axes for collapse and expansion of the base, the roof and the opposing side walls into and out of a fold-flat condition for storage or transport.

In one embodiment, the detection device comprises:

a movable floor underlying the travel path of the pushing unit;

a fulcrum beneath the movable floor at a distance spaced forwardly from the access-way, the movable floor being biased about the fulcrum into a default position in which a front end of the movable floor on a first side of the fulcrum opposite the access-way resides at ground level and an opposing rear end of the movable floor on a second side of the fulcrum adjacent the access-way resides in raised state elevated above ground level; and a sensing switch operably associated with the movable floor and installed in a control circuit with the actuator such that downward movement of the rear end of the movable floor about the fulcrum, and associated upward movement of the front end of the movable floor, as an animal traverses over the fulcrum on said movable floor changes a state of the sensing switch to activate the actuator through said control circuit.

The switch may be indirectly switched by the movement of the movable floor about the fulcrum via a linkage connected between the movable floor and the sensing switch.

According to a second aspect of the invention, there is provided an entrance-urging apparatus for encouraging entry of an animal into an enclosure of an animal trap through an access-way thereof, the entrance-urging apparatus comprising:

a pushing unit pivotally movable about a pivot axis between a withdrawn position and working position, the pushing unit being arranged for pivotal support at a location outside the enclosure of the animal trap and adjacent to the access-way thereof in a manner placing the pivot axis generally parallel to a plane of the access-way such that the access-way is unobstructed by the pushing unit in the withdrawn position and substantially obstructed by the pushing unit in the working position;

an actuator coupled to the pushing unit and operable to effect movement thereof from the withdrawn position into the working position; and an animal detection device coupled to the actuator and operable to detect presence of an animal at an approach area residing within a travel path followed by the pushing unit between the withdrawn and working positions, the animal detection device being arranged to effect movement of the pushing unit into the working position upon detection of the animal at the approach area.

According to a third aspect of the invention, there is provided a method of encouraging entry of an animal into an enclosure of an animal trap, the method comprising:

using an animal detection device to automatically detect presence of the animal at an approach area that is located outside the enclosure of the animal trap, is located adjacent to an access-way of the enclosure that leads into an interior space thereof, and is located within a travel path of a pushing unit that is movable from a withdrawn position unobstructive to the access-way into a working position substantially obstructing the access-way;

based on the detection of the animal at the approach area, controlling an actuator using an output signal from the animal detection device in order to automatically move the pushing unit along the travel path from the withdrawn position to the working position, thereby encouraging the animal into the access-way into the interior space of the closure.

BRIEF DESCRIPTION OF THE DRAWINGS

One or more preferred embodiments of the invention will now be described in conjunction with the accompanying drawings in which:

FIG. 4A schematically illustrates an alternative motorized pusher configuration in which an output link reciprocally driven by a windshield wiper motor operates the pushing unit.

FIG. 4B schematically illustrates control circuitry of the motorized pusher configuration of FIG. 4A.

FIG. 5 schematically illustrates a sensing circuit of the control circuitry of FIG. 4B.

FIG. 6A is a schematic overhead plan view of bird trap with an alternate pusher configuration for encouraging an approaching bird into the trap enclosure.

FIG. 6B is a schematic side elevational view of the bird trap of FIG. 6A.

FIG. 6C is a schematic perspective view of the pusher configuration from the trap of FIGS. 6A and 6B, with a plate of the pusher show in a transparent state to reveal other components of the pusher situated behind said plate.

FIG. 7 is a schematic side elevational view of an activation system for the bird trap of FIG. 1 or 6, which senses the presence of an approaching bird and triggers activation of the pusher to encourage the bird into the trap enclosure.

In the drawings like characters of reference indicate corresponding parts in the different figures.

DETAILED DESCRIPTION

Figure 1A:
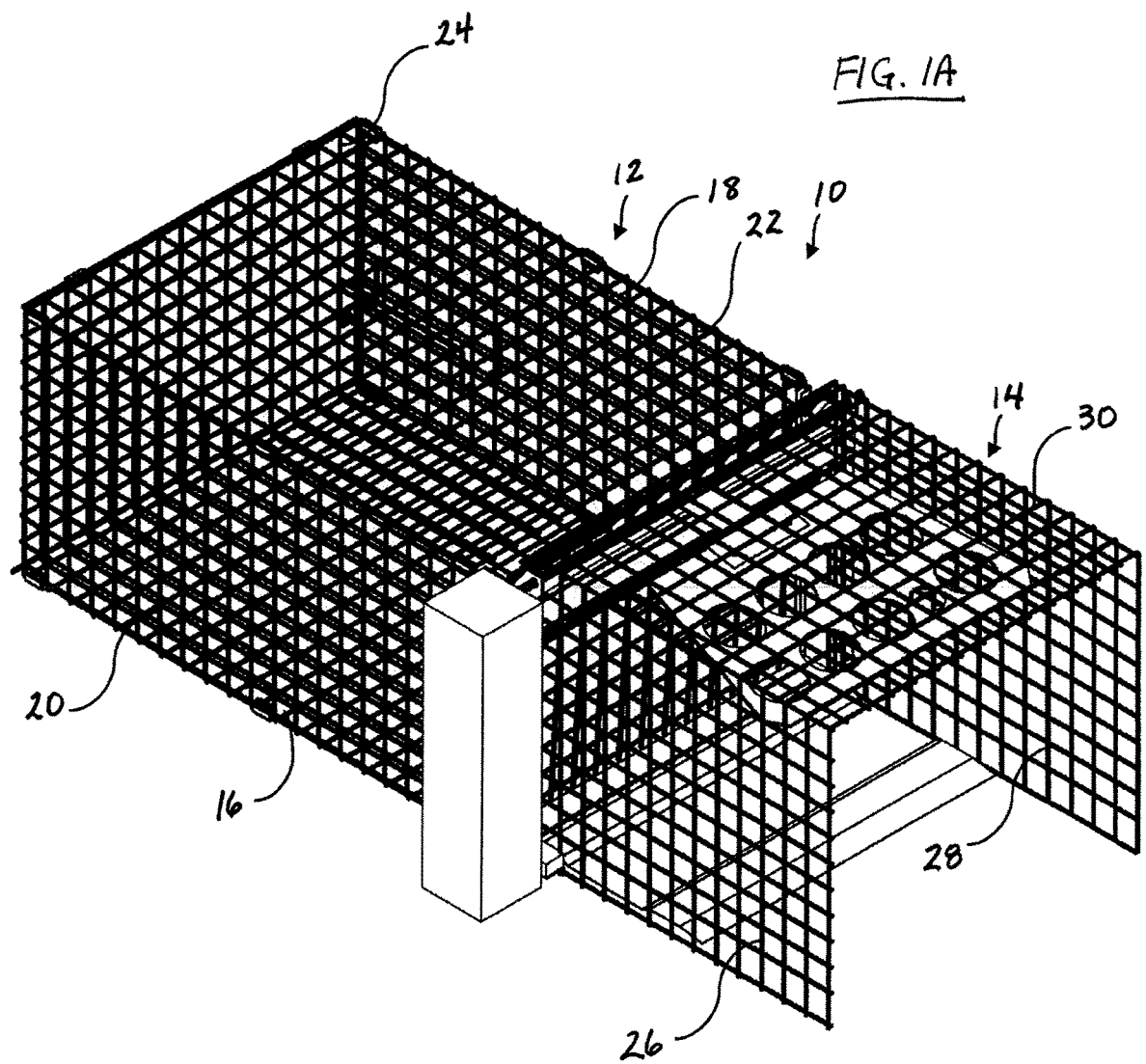
FIG. 1A is a perspective view of a bird trap according to the present invention, which incorporates a fold-flat caged enclosure and a detachably connected entrance assembly for encouraging entry of the bird into the enclosure.

FIG. 1A shows a bird trap according to one embodiment of the present invention. Although described herein as a "bird trap", the same or similar embodiments could alternatively be employed for trapping animals of other types. The trap 10 of the illustrated embodiment is made up of two main sections detachably coupled together for use, particularly an enclosure assembly 12 defining an interior space in which the animal in question is to be captured, and an entrance assembly 14 coupled to the enclosure 12 for the purposes of encouraging entrance of the animal into the interior space of the enclosure.

With continued reference to FIG. 1A, the enclosure 12 is of a cage type construction in which planar rectangular walls and panels each feature a grid-shaped construction of perpendicularly crossing bars or rods of aluminum or other metal, whereby the open grid structure of the enclosure walls and panels allows users easily detect the presence of a captured animal on a convenient visual basis, and allows a notable volume of airflow through the enclosure for the humane treatment of the animal concerned. In a conventional manner, the illustrated enclosure is of a rectangular volume, having parallel, equally-sized base and roof panels 16, 18 and parallel and equally-sized side wall panels 20, 22 that stand upright from the base panel 16 in order to carry the roof panel 18 at a height spaced thereabove at the top ends of the side wall panels 20, 22. A rear wall panel 24 spans between the roof and base panels and the two side wall panels at a rear end of the enclosure. The opposing front end of the enclosure lacks a corresponding end wall panel, and is instead left open to define an access-way by which the animal can gain entry to the interior space of the enclosure.

The entrance assembly 14 resides outside the enclosure adjacent the access end thereof, and features a pair of generally rectangular side wall panels 26, 28 lying parallel to those of the enclosure 12 in generally the same respective planes. The entrance assembly 13 also features a rectangular top cover panel 30 perpendicularly joining together the top ends of the two side wall panels 26, 28 in parallel, generally coplanar relationship with the roof 18 of the enclosure 12, whereby the panels 26, 28, 30 lie on three sides of a rectangular volume of space that generally matches the cross-sectional shape and size of the interior space of the enclosure in planes thereof that lie perpendicularly to a length direction in which the ends of the enclosure are separated. As shown, each panel or wall of the entrance assembly may have the same grid-shaped form as those of the enclosure 12 so to collectively define a cage structure.

Figure 2A:
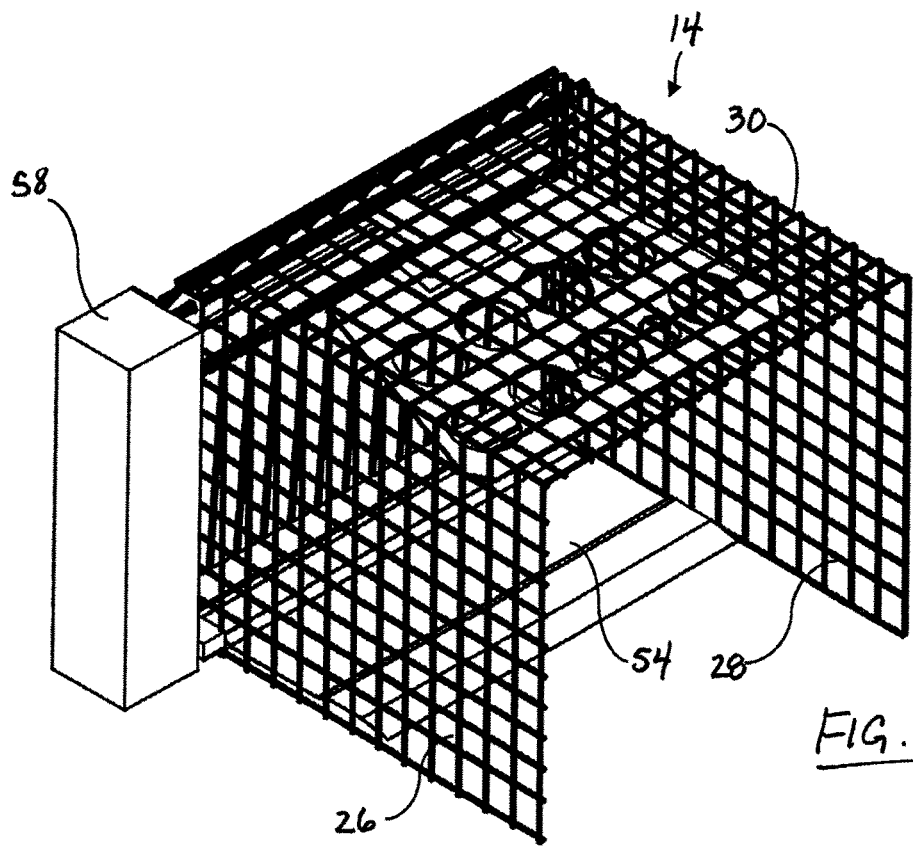
FIG. 2A is a perspective view of the entrance assembly of FIG. 1 in isolation, with a motorized pushing unit thereof in a withdrawn position leaving a one-way entrance area of the assembly unobstructed.
Figure 2B:
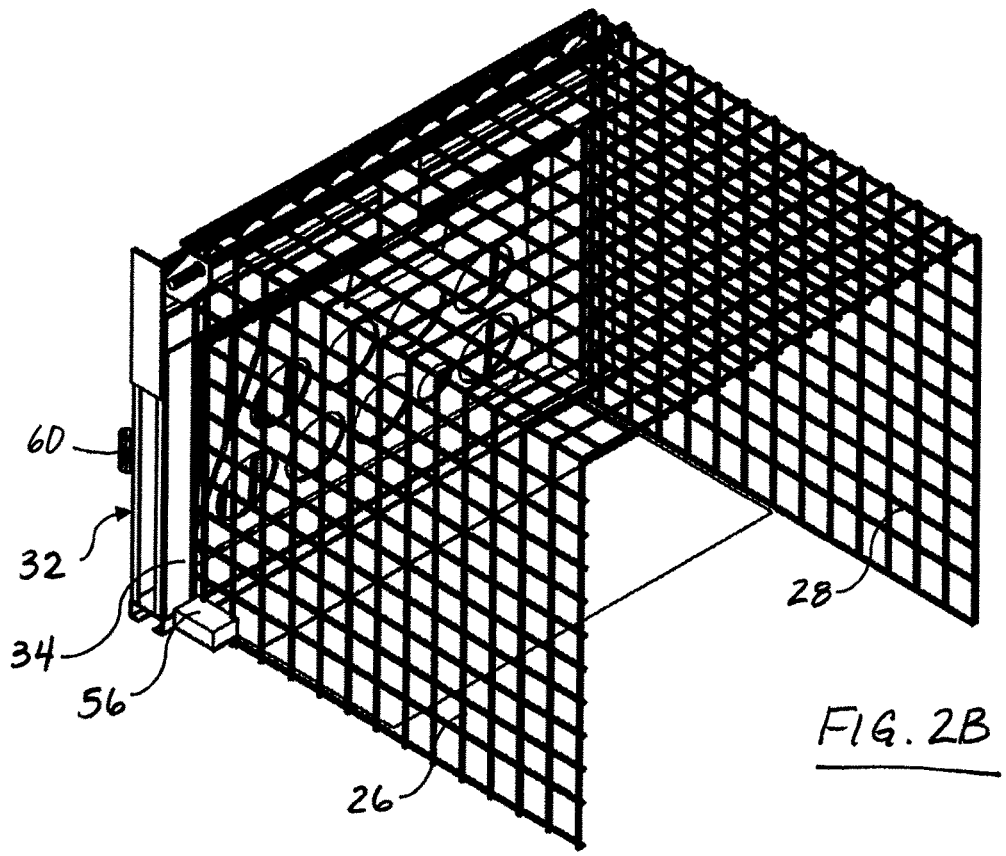
FIG. 2B is a perspective view of the entrance assembly of FIG. 2A with the motorized pushing unit thereof in a working position overlying the one-way entrance area, and with a motor and associated housing removed from the assembly.
Figure 2C:
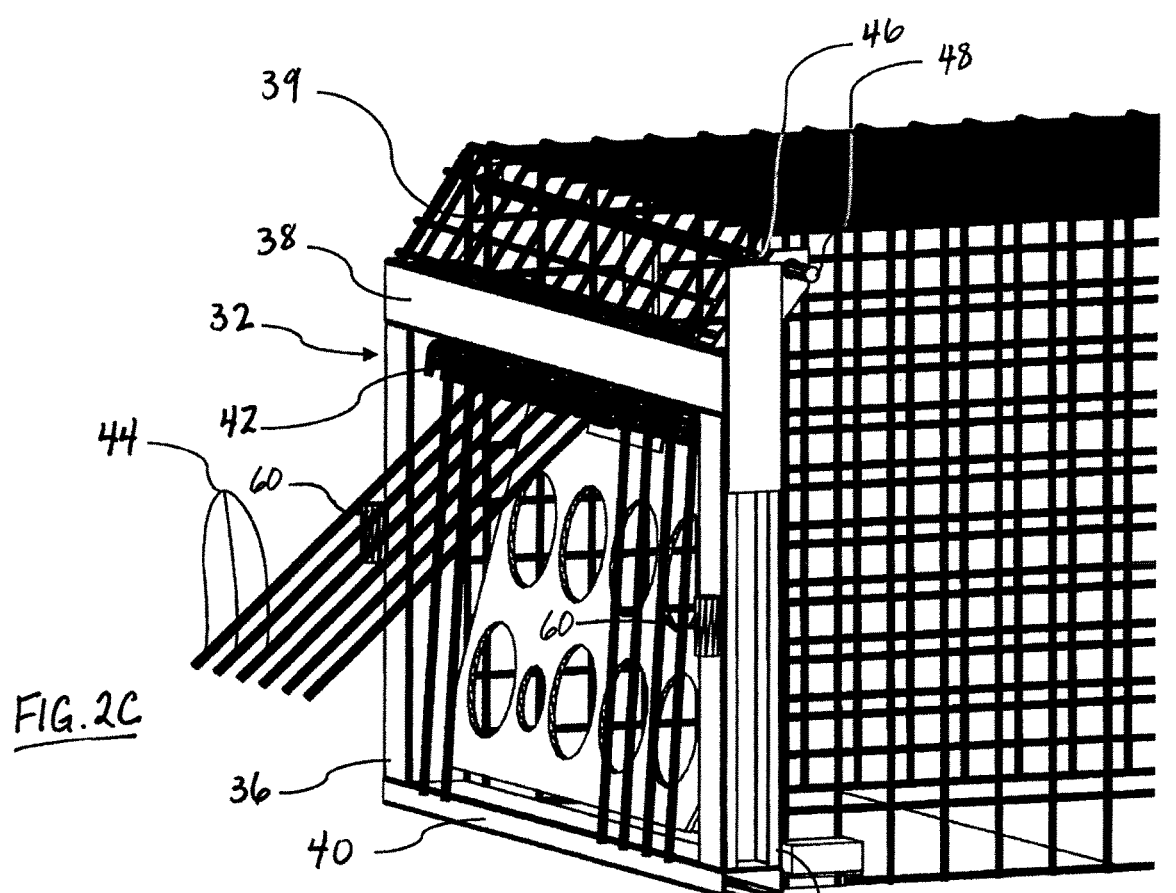
FIG. 2C is a perspective view of the entrance assembly of FIG. 2B with the pushing unit in the working position and with a one-way gate of the entrance area in a partially opened condition.
Figure 2D:
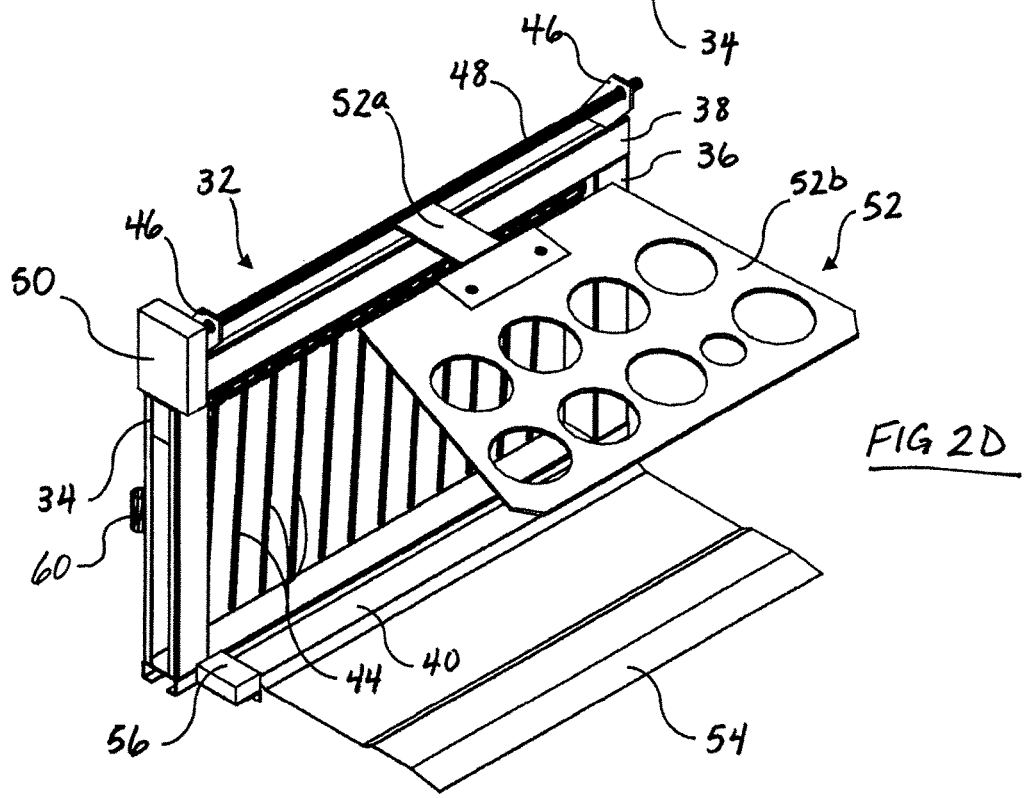
FIG. 2D is a perspective view of the entrance assembly of FIG. 2A with side and top panels thereof removed, along with the motor housing.

Turning to FIG. 2D, at the end of the entrance assembly that lies adjacent to access opening of the enclosure 12, the entrance assembly 14 features an entrance frame 32 featuring two uprights 34, 36 each fixed to a respective one of the side wall panels 26, 28 of the entrance assembly, a bottom cross-member 40 horizontally joining the two uprights 34, 36 together at the bottom ends thereof, and a top cross-member 38 horizontally joining the two uprights 34, 36 together at a height spaced above the bottom cross-member 38. These frame members may, for example, be formed from respective pieces of metal channel. The top cross member 38 of the entrance frame 32 resides at a short distance below the plane of top panel 30. A thickness of the frame measured in the length direction of the enclosure (i.e. parallel to the side wall panels of the enclosure and entrance assemblies) juts rearwardly toward the enclosure from the ends of the entrance assembly's side wall panels 26, 28, and a small rectangular panel 39 lies in an oblique plane sloping downwardly and rearwardly from the rear end of the top panel 30 to attach to the top cross-member 38 of the frame 32.

As best shown in FIG. 2C, A circular rod 42 spans horizontally between the two vertical uprights 34, 36 of the frame 32 a short distance beneath the top cross-member 38 thereof in order to define a cross-member from which multiple tines 44 are pivotally suspended at respective positions spaced apart therealong in order to define a one-way gate of the type outlined in the background section above. The length of teach tine 44 exceeds the height measured from the bottom cross-member 40 of the frame 32 to the cross-bar rod 42 of the one-way gate, whereby the lower end of each tine hangs downwardly past the topside of the bottom frame member 40 at the rear side thereof that faces into the interior space of the enclosure. Each tine 44 can thus swing rearwardly out of its naturally hanging position, thus passing rearwardly into the interior space of the enclosure through the access opening thereof and swinging upwardly as it does so. The rectangular frame 32 delimits an entrance opening to the access way that leads into the interior space of the enclosure.

The one-way gate installed in this entrance opening thus operates in the same manner as for a conventional bird trap of the type described in the background section above to allow birds to walk through the access opening into the interior of the enclosure, but prevent them from exiting in the reverse direction. As outlined below, although the present invention incorporates this known type of one-way gate, an extra mechanism is provided to encourage birds to travel through the one way gate into the interior space of the enclosure.

The two uprights 34, 36 of the entrance frame 32 each extend upwardly past the top cross-member 38, where they carry forwardly jutting lobes or lugs 46 that cooperate to rotatably carry a support shaft 48 that lies horizontally cross-wise to the entrance opening (i.e. parallel to the entrance frame's top cross-member 38 and the one-way gate's cross-bar rod 42) at an elevation spaced above the entrance opening at a short distance beneath the top panel 30. With reference to FIG. 2D, an electric motor 50 is mounted to one of the uprights 34 of the entrance frame 32 and has its output shaft coupled to the support shaft 48 in order to drive rotation thereof about its central longitudinal axis. A paddle-shaped pushing unit 52 is fixed to the support shaft, the longitudinal axis of which thus defines a pivot axis about which this pushing unit 52 is movable by operation of the motor 50. A stem 52a of the paddle-shaped pusher 52 is attached to the support shaft 50, while a broad plate 52b of the paddle-shaped pusher 52 is fixed to a distal end of the stem 52a that lies furthest from the shaft 50. The broad plate 52b has a surface area comparable to that of the entrance opening bound by the entrance frame 32, and the stem 52a has a length generally equal to the distance from the support shaft to the top edge of the entrance opening (as defined by the underside of the top cross-member 38 of the entrance frame 32). The paddle member 52 may be made of metal, plastic, or other material, and as shown, may feature a plurality of holes formed in the broad plate.

Accordingly, as shown in FIGS. 2B and 2C, when the pusher 52 is in a position hanging downward from the support shaft 50, it occupies the substantial majority of the entrance opening, and thus also obstructs the access-way opening of the enclosure 12. As shown in FIGS. 2A and 2D, the pusher 52 is pivotal upwardly and forwardly out of the access-obstructing position, by motor-driven rotation of the support shaft 50, into a withdrawn position retracted from the entrance opening and lying nearly parallel to the top panel 30 at a close elevation therebeneath. In the withdrawn position, the pusher 52 thus lies in a generally horizontal plane so as to be more parallel to the top panel of the entrance assembly and the roof panel of the enclosure than it does to the vertical planes of the access and entrance openings of the enclosure and entrance assembly, while the reverse of this is true of the pusher's access-obstructing position hanging downwardly from the support shaft in a generally vertical plane.

Referring to FIG. 2D, a base 54 of the entrance assembly is attached to the bottom cross-member 40 of the entrance frame 32 and spans forwardly therefrom to lie atop the ground at a position residing beneath, and generally opposite to, the withdrawn position of the pusher 52. During movement from the withdrawn position to the working position, the pusher 52 sweeps downwardly and forwardly along an arcuate travel path over the base toward the entrance opening bound by the entrance frame 32. The base 54 defines an approach area that must be traversed by the animal in order to pass through the entrance opening into the enclosure via the access way thereof.

The entrance assembly includes a detection device operable to detect the presence of the animal atop the base at the approach area, which confirms the presence of the animal within the travel path of the pusher 52. In response to this detection of an animal at the approach area, an output signal from the sensor causes the motor controller to drive the motor 50 in a first rotational direction moving the pusher from the withdrawn position toward the working position at the entrance opening. Different types of detection devices may be employed for this purpose. In one embodiment, a proximity detector 56, for example an optical proximity sensor, may be employed to monitor for the presence of an animal at the approach area, or a pressure sensitive pad may define the base, or be mounted atop the base, in order to detect the presence of an animal by exertion of a downward pressure on the pad by the weight of the animal. Alternatively, the base may be movably mounted to allow downward displacement thereof when subject to a load on the topside thereof, with a mechanical switch residing below the base. In such an embodiment, the weight of the base is alone insufficient to depress the contact of the switch, but the addition of the animal's body weight to the base results in depression of the switch contact. This change of state in the switch between its open and closed states acts confirms the presence of the animal at the approach area, and the change of state in a control circuit containing the switch acts as an output "presence detected" signal to trigger activation of the motor.

As a result, when an animal arrives at the approach area, its presence is detected within the travel path of the pusher, and this triggers movement of the pusher 52 from the withdrawn position toward the entrance opening, during which the paddle-shaped pusher 52 urges the animal into the enclosure through the entrance opening of the entrance assembly and the adjacent access opening of the enclosure. During this application of a gentle pushing force against the animal by the pusher 52, the side wall panels 26, 28 of the entrance assembly block lateral escape of the animal out of the pusher's travel path, thereby ensuring that the arrival of the animal at the approach area will result in a successful urging of the animal into the enclosure.

A limit switch may be used to detect the arrival of the pusher 52 at the working position, and trigger activation of the motor in the reverse direction, thereby acting to automatically return the pusher 52 to the withdrawn position. The trap is thus automatically reset, allowing use of a sufficiently large enclosure to house multiple animals of the expected type therein. The tines 44 of the one-way gate, being of sufficient close spacing to one another to prevent the animal from being able to pass between any two adjacent tines, act in a conventional manner to prevent the trapped animal from escaping the enclosure through the access opening, even when the pusher 52 has been reset to the withdrawn position ready for a subsequent trapping action.

A second limit switch may be used to detect the successful return of the pusher 52 back to the default ready position, and thus deactivate the motor. Assembly of a basic control circuit for operation of a battery-powered DC motor in both directions over a predefined range of movement between two positions spaced angularly apart around the motor's driveshaft axis is well within the ambit of an ordinary person skilled in the art of electronic traps, and thus is not described herein. As an alternative to a basic control circuit, a microcontroller to which the limit switches and sensor are connected as inputs may be programmed to provide output signals for controlling the motor accordingly. As shown in FIGS. 1A and 2A, the motor and associated controls may be contained within a common housing 58 mounted to the upright 34 of the entrance frame. The housing may also contain one or more batteries acting as the power supply for the motor, sensor and associated control components.

FIGS. 4A and 4B schematically illustrate an alternative motor and control configuration using operation of a motor in only a single direction to control movement of the pusher back and forth between the withdrawn and working positions. With reference to FIG. 4A, the motor 50' is a conventional windshield wiper motor featuring an armature with a worm gear (not shown) that drives an output gear 70 to which an output link 72 is pivotally coupled. An inner end of the output link 72 is pivotally coupled to the output gear 70 at a radial distance outward from the output gear's rotational axis, which is parallel to the output link's pivot axes. The output link 72 reaches outward from a housing 58' of the motor in which the armature, worm gear, and output gear are housed. The outer end of the wiper motor's output link 72 is pivotally coupled to an input end of a connection link 74 whose opposing output end is pivotally coupled to the pusher 52, for example being fixed to the rotatable support shaft on which the pusher 52 is carried. Via the worm and output gear, the rotation of the motor's armature in a predetermined direction will reciprocate the output link 72 back and forth, and thereby pivot the pusher 52 back and forth between the withdrawn and working positions.

FIG. 4B illustrates a control schematic in which the sensor 56 is wired to the coil of a normally open relay 76 in a sensing circuit 78. The switch of the relay 76 is wired to the motor 50' in a motor control circuit 80. The illustrated motor control circuit 80 is a conventional wiper motor control circuit, with a high/low speed selection switch 82 for selecting between two predetermined motor speeds, and a park switch 84 operated by a cam (shown schematically at 87 in FIG. 4A) on the output gear of the wiper motor 50'. The park switch 84 is a single pole double throw plunger switch normally residing in an on position connecting the DC power supply (e.g. 12V battery) to the motor to drive rotation thereof. The cam on the output gear engages the plunger of the park switch 84 as the output gear reaches a predetermined rotational position corresponding to the default 'parked' position of the output link, which in the context of the present invention corresponds to the withdrawn position of the pusher 52. This engaged position of the plunger corresponds to a grounded position of the park switch, which shorts the motor to ground in order to immediately and fully cease the motor's rotation, thereby preventing the pushing unit from overshooting the withdrawn position and returning the park switch to the on position. Accordingly, the arrival of the pusher 52 in the withdrawn position terminates the rotation of the motor armature, thereby stopping the pusher 52 at its default withdrawn position.

When an animal is detected by the sensor, this energizes the relay coil in the sensor circuit to close the relay switch in the motor control circuit, thereby connecting the power supply to the motor through the relay switch (not through the park switch, which remains in the grounded position) and initiating rotation of the motor. The rotation of the motor out of the parked position rotates the cam out of contact with the plunger of the park switch, thereby switching the park switch into its on position coupling the power supply to the motor so that rotation of the motor will continue even after detection of the animal by the sensor 56 ceases and the relay switch therefore re-opens. Accordingly, even after the pusher 52 forces the animal into the enclosure (thereby deactivating the sensor), the motor will continue to rotate, thereby returning the pusher 52 to its withdrawn position, whereupon the park switch is depressed by the cam of the motor's output gear to cease further rotation of the motor until the next time an animal presence is detected by the sensor to once again initiate operation of the pusher 52. An on/off switch 86 is provided to selectively disconnect the power supply from the motor control circuit, whereby the control circuit can be deactivated to prevent operation of the motor during storage or transport of the trap.

Figure 3A:
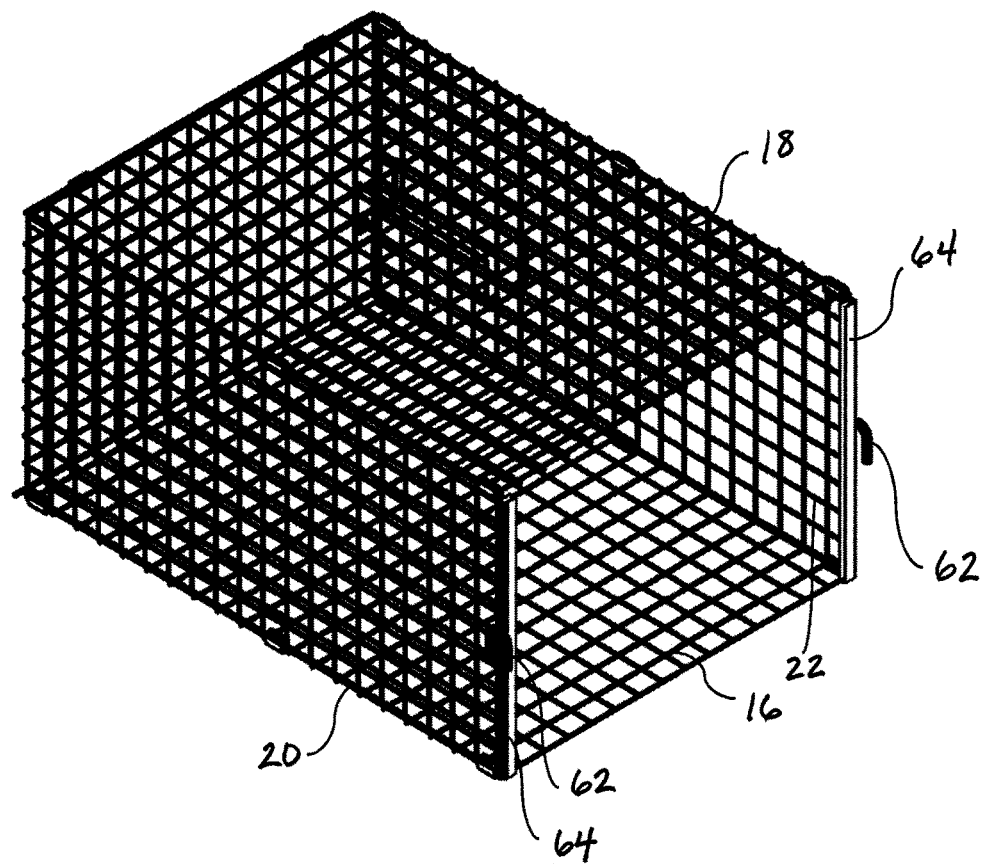
FIG. 3A is a perspective view of the enclosure of FIG. 1A with the entrance assembly removed therefrom.
Figure 3B:
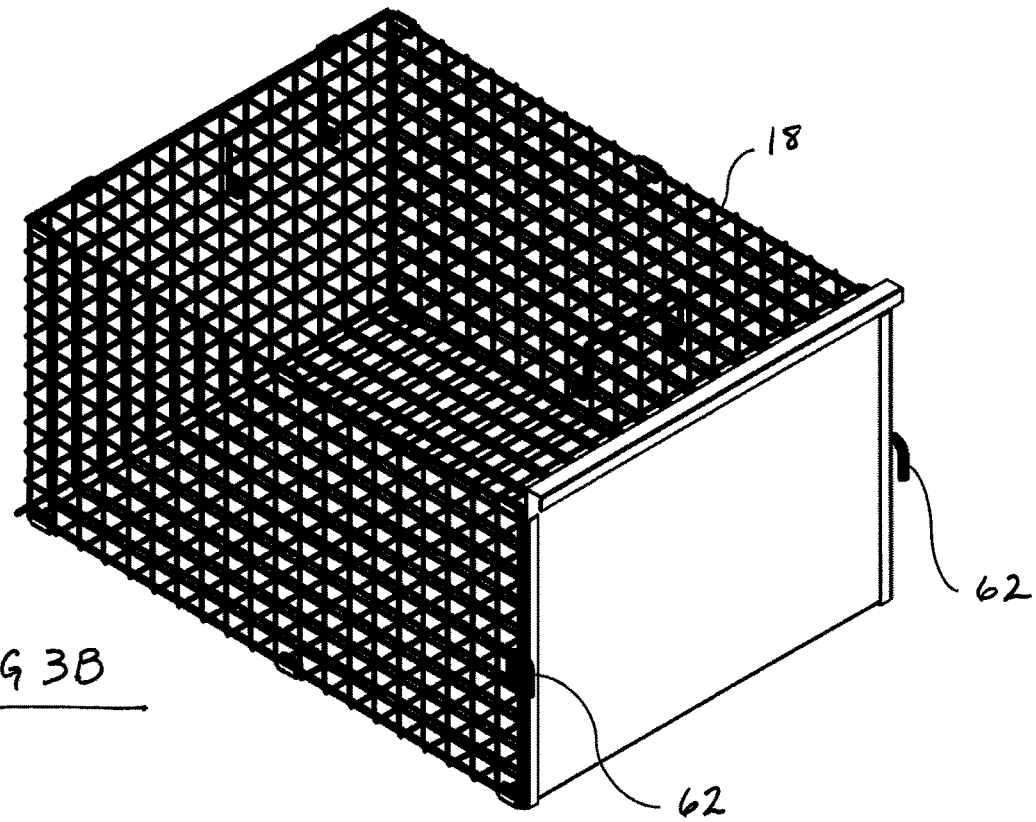
FIG. 3B is a perspective view of the enclosure of FIG. 3A illustrating installation of a sliding closure member at the access opening of the enclosure in order to secure a trapped bird within same.
Figure 3C:
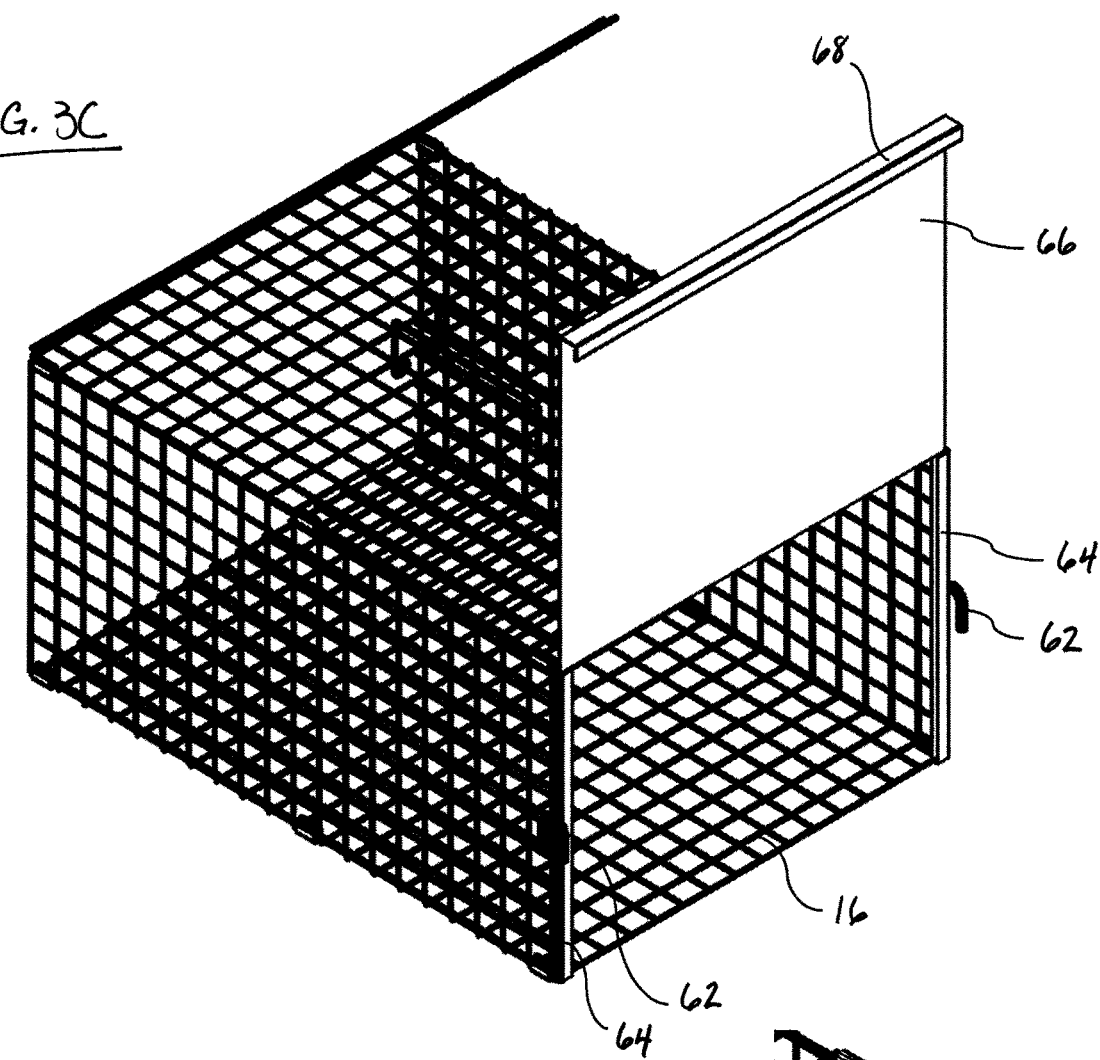
FIG. 3C is a perspective view illustrating removal of the sliding closure member of FIG. 3B, and an opposing end wall of the enclosure cage, in preparation for folding of the side walls, base and roof of the enclosure into a flat condition for space efficient storage or transport.

As shown in FIG. 2C, each upright 34, 36 of the entrance frame 32 features a respective hollow cylindrical sleeve 60, for example formed of a short length of metal tubing welded or otherwise attached to the frame 32. The longitudinal axis of each sleeve 60 is oriented upright so that the sleeve's hollow interior runs vertically through it. As shown in FIGS. 3A-3C, a respective U-shaped metal rod is fixed to each side wall 20, 22 of the enclosure 12 at a position located adjacent to the access opening at an elevation matching those of the sleeves 60 on the entrance assembly. Each U-shaped rod 62 is situated in a downward-opening orientation (i.e. with its U-shape inverted), with one leg of the U-shape fixed to the respective side wall of the enclosure, and the other leg situated forwardly past the vertical plane of the access opening of the enclosure. This forward leg of each rod forms a hook for engaging with a respective one of the sleeves 60 on the entrance assembly. Accordingly, with the entrance assembly 14 seated on the ground, the enclosure 12 is coupled thereto by vertically lowering the enclosure into place beside the entrance assembly with the hook-leg of each U-shaped rod 62 axially aligned with the hook-receiving opening defined by the hollow interior of a respective one of the sleeves 60 on the entrance assembly. Hooked together in this manner, horizontal shifting between the enclosure and entrance assemblies, and separation thereof from one another, are is prevented, thereby maintaining alignment of the enclosure's access opening and the entrance assembly's entrance opening.

The front end of each side wall 20, 22 of the enclosure 12 is equipped with a channel-shaped vertical guide track 64 whose U-shaped cross-section in horizontal planes opens toward the other vertical guide track located across the access opening. As shown in FIGS. 3B and 3C, a closure panel 66 is slidably receivable in the two guide tracks 64 for vertical sliding along the tracks 64 into and out of a closed position overlying the entire access opening at this end of the enclosure. The closure panel 66 can be fully removed from the enclosure by sliding vertically upward out of the top ends of the guide tracks 64. Suitable stop features are provided to prevent sliding of the closure panel 66 downwardly past the closed position blocking off the entire access opening. Such stops may be defined by closed bottom ends of the guide tracks 64, or by a rail 68, flange or other enlarged feature at the top end of the closure panel 66 that cannot fit into the open top ends of the guide tracks.

Figure 3D:
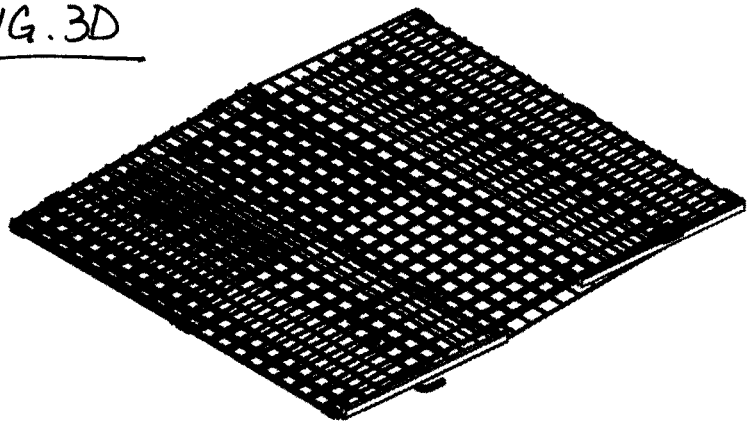
FIG. 3D is a perspective view the side walls, base and roof of the enclosure folded into the flat condition for storage or transport.
Figure 3E:
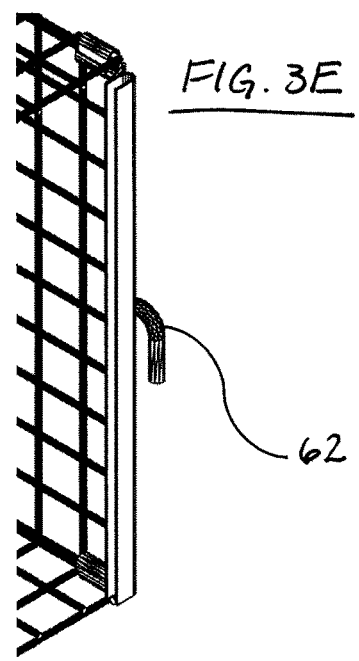
FIG. 3E is a partial closeup perspective view of the enclosure of FIG. 3A showing a guide track for sliding receipt of the closure member and a connection hook for coupling of the entrance assembly to the enclosure.

When an animal has been trapped in the enclosure of the assembled trap, and the trap user wishes to transport the animal, before disconnecting the detachable entrance assembly from the enclosure, the user can insert the closure panel 66 into the guide tracks 64 in order to close off the access opening of the enclosure. The enclosure, and the animal trapped therein, can now be uncoupled from the entrance assembly by simply lifting the enclosure, and thereby releasing the hooks 62 of the enclosure from the mating sleeves 60 of the entrance assembly. In the illustrated embodiment, the enclosure and the contained animal can thus be carried away without the added bulk and weight of the entrance assembly. In other embodiments, the entrance assembly, including the one-way entrance and the animal-encouraging mechanism formed by the pusher, motor and sensor may alternatively be mounted to the enclosure on a permanent non-detachable basis.

Where the lengthwise edges of each side wall panel 20, 22 of the enclosure meet with the corresponding edges of the roof and base panels 16, 18, these panels are hinged together for pivoting relative to one another about these edges, and the rear wall panel 24 is detachably coupled to the side wall, roof and base panels. Accordingly, as shown in FIG. 3D, when the enclosure has been detached from the entrance assembly and the closure panel 66 and rear wall panel 24 are removed from the enclosure, the hinged together side walls 20, 22, base 16 and roof 18 of the enclosure can be folded into a flat configuration laying parallel to one another for space-efficient transport or storage.

It will be appreciated that the unique structure and functionality of the encouraging mechanism for urging animals into the enclosure may be employed regardless of whether the enclosure is collapsible into a flat-folded or other compact condition for storage or transport, and regardless of whether the enclosure is a cage-type structure with wall panels of grid-shaped configuration.

FIGS. 6A and 6B illustrate a variant of the above described bird trap which differs only terms of its configuration of the pushing unit and associated position of the motor 50 and attached support shaft 48. FIG. 6B also illustrates one possible option for the detection device that activates the motor upon arrival at the approach area. The detection device is also illustrated independently of the rest of the trap in FIG. 7.

Figure 1B:
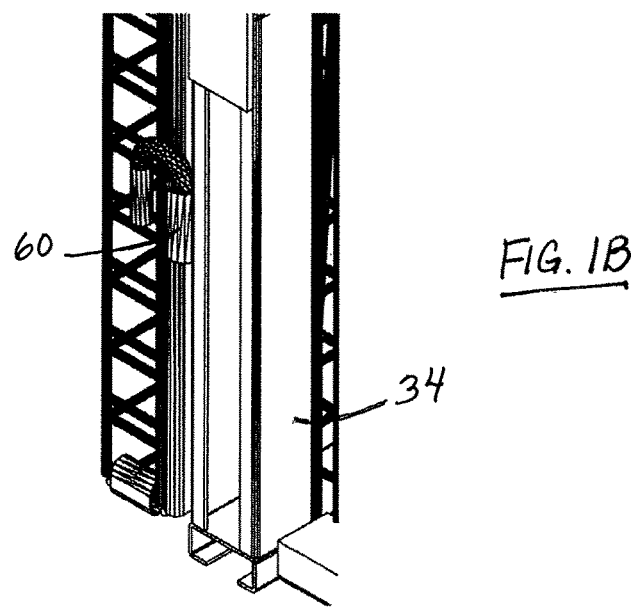
FIG. 1B is a partial closeup perspective view of the bird trap of FIG. 1, illustrating a detachable connection between the enclosure and the entrance assembly.

Whereas the trap of FIGS. 1 and 2 place the support shaft 48 directly over the entrance opening, the variant of FIG. 6 places the shaft at a distance spaced further forwardly from the entrance opening, for example approximately half way between the front end rear ends of the entrance assembly 14'. Once again, the support shaft 48 resides near the top panel 30 of the entrance assembly at an elevation slightly exceeding the height of the entrance opening. Whereas the pushing unit 52 of the earlier figures featured a planar pusher 52 with a coplanar stem 52a and broad plate 52b, the pushing unit 52' in FIG. 6 employs a right-angle pusher configuration, in which the stem or support member 52a' and the broad plate or pusher member 52b' diverge from one another at ninety degrees. As with the pushing unit 52 of the earlier figures, the broad plate or pusher member 52b' has a broader width than the stem or support member 52a' in the longitudinal direction of the rotatable shaft.

One end of the stem or support member 52a' is attached to the support shaft 48', and the other end of the stem or support member 52a' carries the planar pusher member 52b'. The stem or support member 52a' extends radially or tangentially outward from the support shaft 48' at a midpoint of the support shaft. In the withdrawn position of the support unit 52' (shown in solid lines in FIGS. 6A and 6B), the stem or support member 52a' extends horizontally forward from the support shaft and out through the open front end of the entrance assembly, where the pushing member 52b' stands vertically upward from the stem or support member 52a', thereby opening the substantial entirety of the entrance assembly's front end for maximum access by an approaching bird. When the motor is activated by the sensing device, the stem or support member 52a' swings 180-degrees rearwardly under the shaft into the working position (shown in broken lines in FIG. 6B), in which the stem or support member 52a' extends horizontally rearward from the support shaft, and the pushing member 52b' hangs vertically downward from the stem or support member 52a' over the entrance opening. To better illustrate the movement of the pushing unit 52', FIG. 6B also uses broken lines showing an intermediate position of the pushing unit during movement between the withdrawn and working positions.

FIG. 6B includes one example of a suitable detection device, which is also shown in isolation in FIG. 7. The device features a movable floor 88 in the form of a flat activation plate pivotally mounted atop a fulcrum 90 that lies across the entrance assembly in a direction parallel to the support shaft 48 at a distance spaced forwardly outward from the entrance opening so as to reside intermediately between the front and rear ends of the entrance assembly. A front end 88a of the movable floor 88 normally resides at ground level due to an offset between the fulcrum and the movable floor's center of gravity. This acts to gravitationally bias the front end downwardly toward ground level, thus biases the opposing rear end 88b of the movable floor into a raised position elevated above ground level. A first side of the movable floor resides between the fulcrum 90 and the front end of the entrance assembly, while a second side spans from the fulcrum to the entrance opening at the rear end of the entrance assembly. When an animal enters the entrance assembly at the front end thereof, they initially step onto the movable floor from the front end 88a thereof and continue rearwardly toward the entrance opening. As the animal crosses over the fulcrum point 90 from the first side of the movable floor 88 to the second side thereof, the shift of the animal's weight onto the second side of the movable floor overcomes the gravitation bias of the movable floor, thus driving the rear end 88b of the movable floor downward about the fulcrum. An input link 92a of a linkage 92 extends upward from the second side of the movable floor and connects to an output link 92b such that when the second side of the movable floor is driven downward by the presence of the bird, the output link pivots downwardly against the lever of a micro-switch 94, or other type of switch, carried on a wall of the entrance assembly. The micro-switch is wired to the motor control circuit such that the change of the switch from its open state to its closed state activates the motor. Referring briefly to the circuit diagram of FIG. 4B, the micro-switch of the detection device of FIG. 7 may take the place of the entire sensing circuit 78. While the illustrated detection device places the micro-switch above the movable floor and relies on a linkage to operably connect the movable floor to the switch, other embodiments may alternatively place the switch beneath the movable floor for direct interaction between the switch and the movable floor without a cooperating linkage between them. The illustrated embodiment features a stopper 96 disposed beneath the movable floor at or near the rear end thereof to limit the downward travel of the normally raised rear end of the movable floor.

Figure 8A:
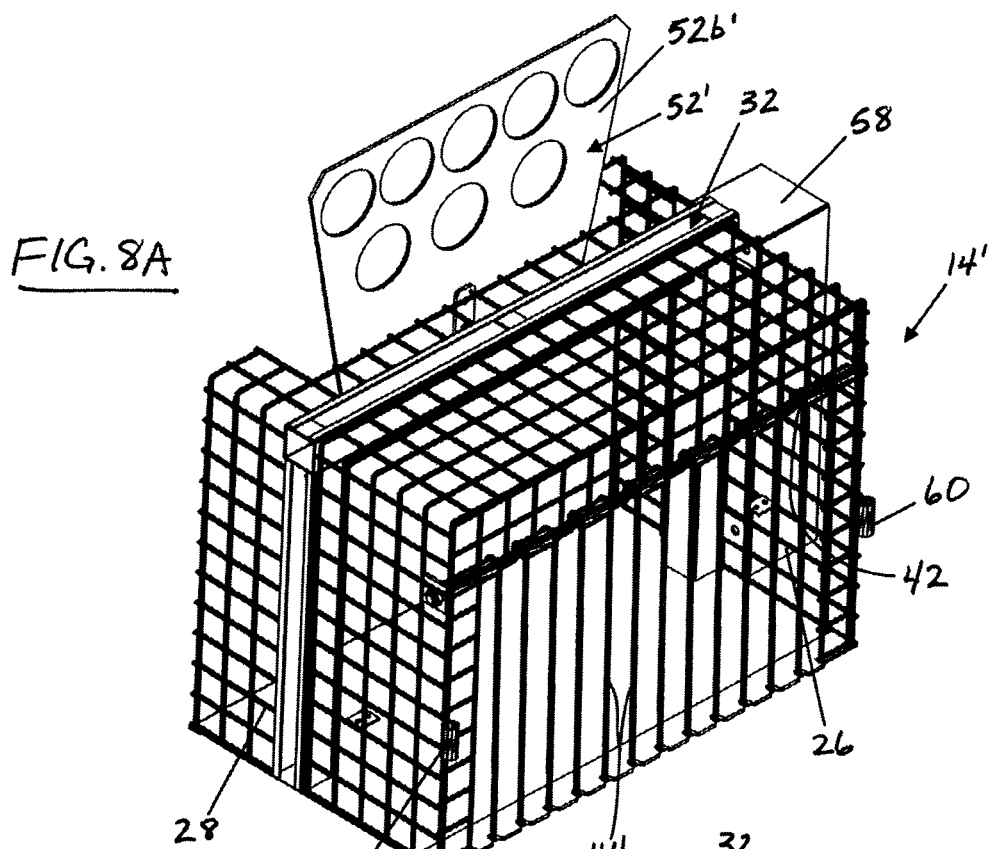
FIG. 8A is a perspective view of the entrance assembly of a bird trap employing the pusher configuration from FIGS. 6A and 6B, with the pusher unit in the withdrawn position.
Figure 8B:
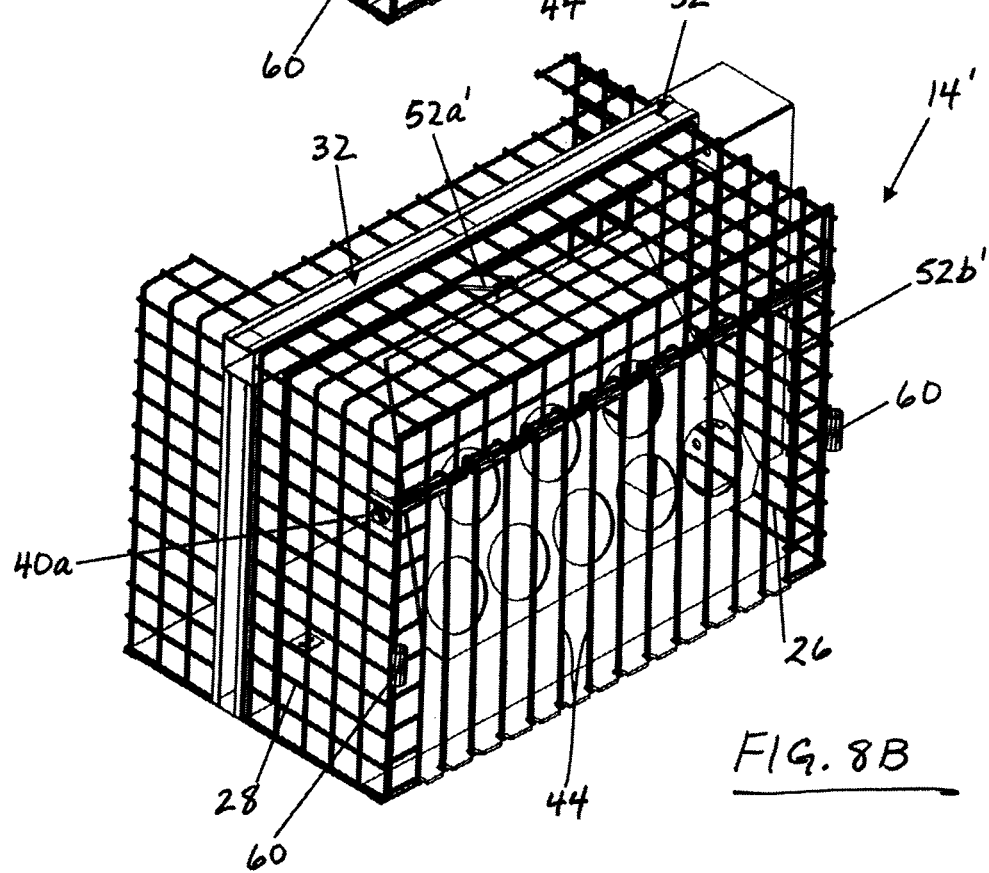
FIG. 8B is a perspective view of the entrance assembly of FIG. 8A with the pusher unit in the working position.
Figure 8C:
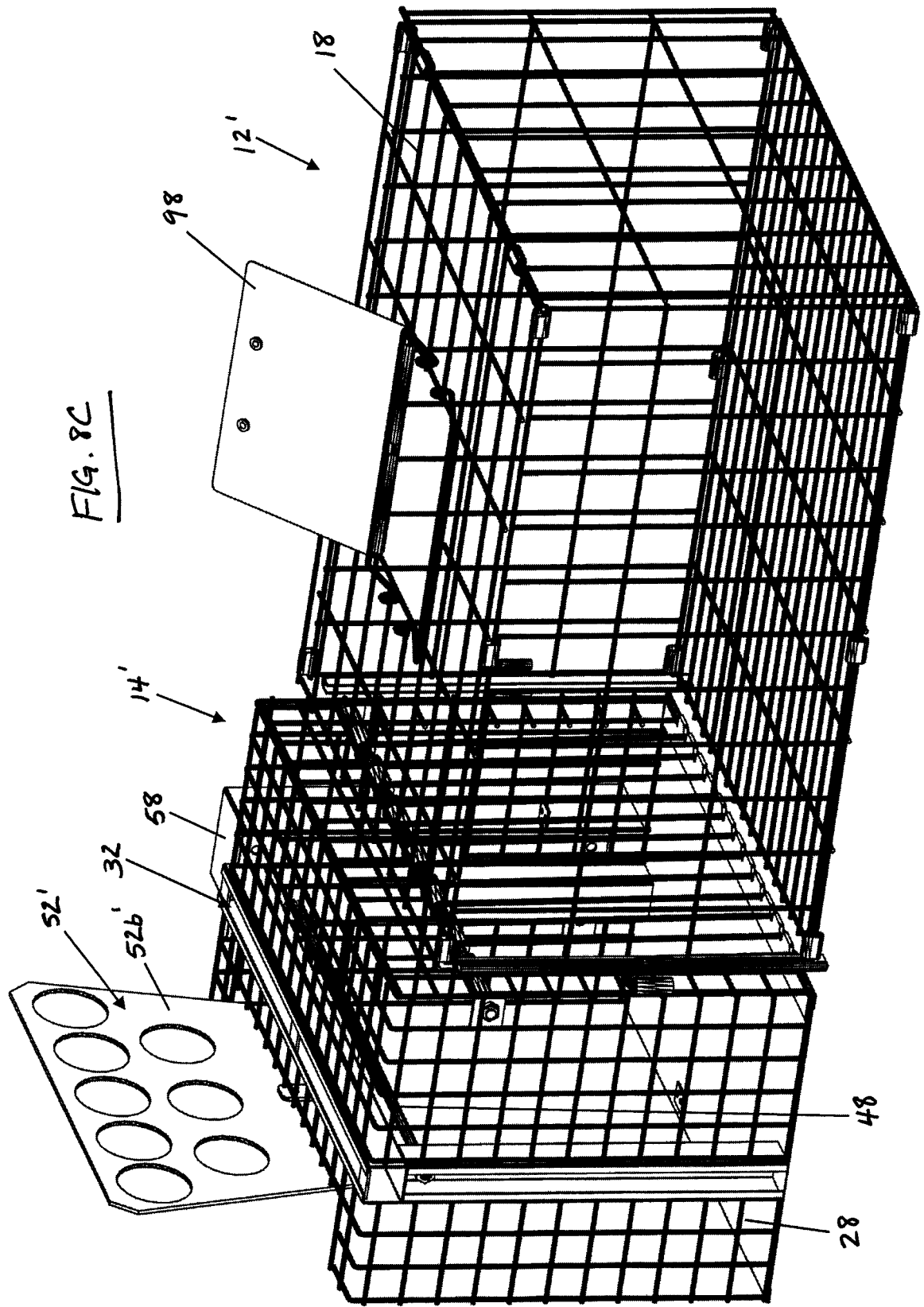
FIG. 8C is a perspective view of an assembled bird trap featuring the entrance assembly of FIG. 8A coupled to a fold flat caged enclosure similar to that shown in FIGS. 3A to 3E.

FIGS. 8A through 8C illustrated implementation of the pusher configuration of FIGS. 6A to 6C in an entrance assembly 14' that is otherwise similar to that of FIGS. 2A through 2C. The frame 32 is situated forwardly of the one-way gate in this implementation, and so the cross-bar rod 42 for the one way gate is mounted separately of the frame 32 by brackets 40a fastened to the side wall panels 26, 28 of the entrance assembly adjacent the rear end thereof. Likewise, the sleeves 60 for hooking the U-shaped rods of the enclosure 12' to the entrance assembly are mounted independently of the frame 32 at the rear ends of the side wall panels 26, 28. The caged enclosure 12' is of similar fold-flat construction to that of FIGS. 3A through 3D, but with the addition of a hinged lid 98 pivotally mounted to the roof panel 18 to provide access to the interior space of the enclosure 12' from a location other than the front end of the enclosure.

While the pusher units 52, 52' in the drawings are pivotal about a horizontal axis lying cross-wise to the entrance and access openings near the top edges thereof for downwardly swinging movement toward the enclosure, other embodiments could alternatively have the pusher arranged for movement about an upright axis at a respective side of the entrance opening to pivot from a withdrawn position lying generally coplanar with the respective side wall of the enclosure into the working position lying over or in the entrance opening.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. An animal trap apparatus with an entrance encouraging means for urging an animal into a trap, said apparatus comprising:
   an enclosure having an interior space bound by a base, upright walls standing upward from the base, and a roof spanning between the upright walls at a height spaced above the base, the enclosure comprising an access-way into the interior space through an absence of, or opening in, an end wall at a first end of the enclosure; and
   an entrance-urging mechanism comprising:
      a pushing unit pivotally supported at a location outside the interior space of the enclosure and adjacent the access-way thereof, the pushing unit being pivotal about an axis generally parallel to a plane of the access-way for movement between a withdrawn position in which the access-way is unobstructed by the pushing unit and a working position in which the pushing unit substantially obstructs the access-way;
      an actuator coupled to the pushing unit and operable to effect movement thereof from the withdrawn position into the working position; and
      an animal detection device coupled to the actuator and operable to detect presence of an animal at an approach area residing outside the interior space of the enclosure and adjacent to the access-way within a travel path followed by the pushing unit between the withdrawn and working positions, the animal detection device being arranged to effect movement of the pushing unit into the working position upon detection of the animal at the approach area, whereby the pushing unit urges the animal toward and through the access-way into the interior space of the enclosure;
   wherein the actuator comprises a motor driving a reciprocating link that is connected to the pushing unit and a park switch operable to terminate rotation of the motor when the pushing unit approaches the withdrawn position, wherein the motor comprises an output gear to which the reciprocating link is pivotally coupled and a cam carried on said output gear in a position engaging the park switch as the pushing unit approaches the withdrawn position.

2. The apparatus of claim 1 wherein the pushing unit is supported adjacent a top edge of the access-way for pivotal motion of the pushing unit about a generally horizontal axis lying cross-wise to the access-way adjacent the top edge thereof.

3. The apparatus of claim 1 wherein the pushing unit is mounted on a rotatable shaft that is coupled to the actuator for driven rotation of the shaft by the actuator to effect the movement of the pushing unit.

4. The apparatus of claim 3 wherein the pushing unit comprises a support member attached to the rotatable shaft and a pushing member attached to the support member at a distance outward from the rotatable shaft.

5. The pushing unit of claim 4 wherein the pushing member has a broader width than the support member in a longitudinal direction of the rotatable shaft.

6. The pushing unit of claim 4 wherein the support member and the pushing member diverge from one another at a non-zero angle.

7. The pushing unit of claim 6 wherein the rotatable shaft is spaced forwardly away from the access-way of the enclosure, and the support member is arranged to reach rearwardly toward the enclosure in the working position, wherein the pushing member hangs downwardly from said support member over the access-way of the enclosure, and reaches forwardly from the enclosure in the withdrawn position, where the pushing member stands upwardly from the support member.

8. The apparatus of claim 1 comprising a pair of side walls standing upright on opposing sides of the approach area to prevent the animal from laterally escaping the travel path of the pushing unit during movement thereof into the working position.

9. The apparatus of any claim 1 wherein the pushing unit is arranged to automatically return to the withdrawn position after reaching the working position.

10. The apparatus of claim 9 further comprising a one-way gate device arranged to automatically open the access-way under pushing of the animal thereinto by the pushing unit, and automatically re-close the access-way after the animal enters the interior space of the enclosure.

11. The apparatus of claim 10 wherein the one-way gate device is removable from the enclosure as part of the entrance-urging mechanism.

12. The apparatus of claim 1 wherein the entrance-urging mechanism is detachably coupled to the enclosure.

13. The apparatus of claim 12 comprising a closure member engagable with the enclosure member at the access-way thereof in a position between the interior space of the enclosure and the attached entrance-urging mechanism in order to enable removal of the detachable entrance-urging mechanism with the animal secured inside the enclosure.

14. The apparatus of claim 13 wherein the closure member comprises a slide panel and the enclosure comprises a pair of slide tracks at opposing edges of the access-way for cooperation with the closure member to guide sliding thereof into and out of a closed condition.

15. The apparatus of claim 14 wherein the slide panel and one of the upright walls of the enclosure at a second end thereof opposite the access-way are removable from the enclosure, and the enclosure is of a fold-flat configuration in which the base, the roof and the upright walls are hinged together about parallel axes for collapse and expansion of the base, the roof and the opposing side walls into and out of a fold-flat condition for storage or transport.

16. The apparatus of claim 1 wherein the detection device comprises:
   a movable floor underlying the travel path of the pushing unit;
   a fulcrum beneath the movable floor at a distance spaced forwardly from the access-way, the movable floor being biased about the fulcrum into a default position in which a front end of the movable floor on a first side of the fulcrum opposite the access-way resides at ground level and an opposing rear end of the movable floor on a second side of the fulcrum adjacent the access-way resides in a raised state elevated above ground level; and a sensing switch operably associated with the movable floor and installed in a control circuit with the actuator such that downward movement of the rear end of the movable floor about the fulcrum, and associated upward movement of the front end of the movable floor, as an animal traverses over the fulcrum on said movable floor changes a state of the sensing switch to activate the actuator through said control circuit.

17. An animal trap apparatus with an entrance encouraging means for urging an animal into a trap, said apparatus comprising:
   an enclosure having an interior space bound by a base, upright walls standing upward from the base, and a roof spanning between the upright walls at a height spaced above the base, the enclosure comprising an access-way into the interior space through an absence of, or opening in, an end wall at a respective end of the enclosure; and
   an entrance-urging mechanism comprising:
      a pushing unit pivotally supported at a location outside the interior space of the enclosure and adjacent the access-way thereof, the pushing unit being pivotal about an axis generally parallel to a plane of the access-way for movement between a withdrawn position in which the access-way is unobstructed by the pushing unit and a working position in which the pushing unit substantially obstructs the access-way;
      an actuator coupled to the pushing unit and operable to effect movement thereof from the withdrawn position into the working position; and
      an animal detection device coupled to the actuator and operable to detect presence of an animal at an approach area residing outside the interior space of the enclosure and adjacent to the access-way within a travel path followed by the pushing unit between the withdrawn and working positions, the animal detection device being arranged to effect movement of the pushing unit into the working position upon detection of the animal at the approach area, whereby the pushing unit urges the animal toward and through the access-way into the interior space of the enclosure;
   wherein the detection device comprises:
   a movable floor underlying the travel path of the pushing unit;
   a fulcrum beneath the movable floor at a distance spaced forwardly from the access-way, the movable floor being biased about the fulcrum into a default position in which a front end of the movable floor on a first side of the fulcrum opposite the access-way resides at ground level and an opposing rear end of the movable floor on a second side of the fulcrum adjacent the access-way resides in a raised state elevated above ground level; and
   a sensing switch operably associated with the movable floor and installed in a control circuit with the actuator such that downward movement of the rear end of the movable floor about the fulcrum, and associated upward movement of the front end of the movable floor, as an animal traverses over the fulcrum on said movable floor changes a state of the sensing switch to activate the actuator through said control circuit.

18. The apparatus of claim 17 wherein the actuator comprises a motor driving a reciprocating link that is connected to the pushing unit, and a park switch operable to terminate rotation of the motor when as the pushing unit approaches the withdrawn position, wherein the motor comprises an output gear to which the reciprocating link is pivotally coupled and a cam carried on said output gear in a position engaging the park switch as the pushing unit approaches the withdrawn position.

* * * * *